United States Patent
Conlee et al.

[11] Patent Number: 5,496,063
[45] Date of Patent: Mar. 5, 1996

[54] PARTICULATE IMPINGEMENT DEVICE FOR AIR BAG

[75] Inventors: James K. Conlee, Dayton; Daniel A. Rhule, Miamisburg; Joel M. Werbelow, Vandalia, all of Ohio

[73] Assignee: General Motors Corporation, Detroit, Mich.

[21] Appl. No.: 352,962

[22] Filed: Nov. 25, 1994

[51] Int. Cl.⁶ ................................................. B60R 21/28
[52] U.S. Cl. ................................. 280/739; 280/743.1
[58] Field of Search .......................... 280/739, 743 R, 280/742, 728 R, 738, 740, 743.1, 728.1

[56] References Cited

U.S. PATENT DOCUMENTS

| | | | |
|---|---|---|---|
| 3,820,814 | 6/1974 | Allgaier et al. | 280/742 |
| 3,887,213 | 6/1975 | Goetz | 280/739 |
| 4,111,458 | 9/1978 | Okada et al. | 280/739 |
| 5,007,662 | 4/1991 | Abramczyk et al. | 280/739 |
| 5,044,663 | 9/1991 | Seizert | 280/730 R |
| 5,141,787 | 8/1992 | Yamamoto | 428/35.5 |
| 5,219,179 | 6/1993 | Eyrainer et al. | 280/739 |
| 5,310,215 | 5/1994 | Wallner | 280/739 |

FOREIGN PATENT DOCUMENTS

| | | | |
|---|---|---|---|
| 4002543 | 1/1992 | Japan | 280/739 |
| 6286570 | 10/1994 | Japan | 280/739 |

*Primary Examiner*—Margaret A. Focarino
*Assistant Examiner*—Peter C. English
*Attorney, Agent, or Firm*—Charles E. Leahy

[57] ABSTRACT

A particulate impingement device is carried by the air bag and has an impingement surface overlying the vent hole at a spaced relationship away from the vent hole so that the inflation gas exiting the air bag through the vent hole impinges on the impingement surface to deposit particulate by-products within the inflation gas upon the impingement surface.

3 Claims, 2 Drawing Sheets

PARTICULATE IMPINGEMENT DEVICE FOR AIR BAG

The invention relates to air bags and more particularly provides a device for impingement of particulates borne by the inflation gas.

BACKGROUND OF THE INVENTION

It is well known in motor vehicles to provide an air bag inflatable by an inflation gas. The inflation gas is generated on demand by a pyrotechnic or other gas generating device. The gas generating device employs a chemical reaction which may involve the generation of particulate by-products. The gas generating device typically includes filtration or other devices which are known to satisfactorily filter particulate by-products from the stream of inflation gas.

It is also well known to provide one or more vent holes in an air bag to vent a portion of the inflation gas into the passenger compartment. The vent hole is traditionally provided in a surface of the air bag which points generally away from the restrained occupant and, accordingly, any particulate that may be in the inflation gas stream is directed away from the occupant.

SUMMARY OF THE INVENTION

The present invention provides a particulate impingement device which overlies the vent hole to capture particulate in the stream of vented inflation gas.

DESCRIPTION OF THE PREFERRED EMBODIMENT

Figure 1:
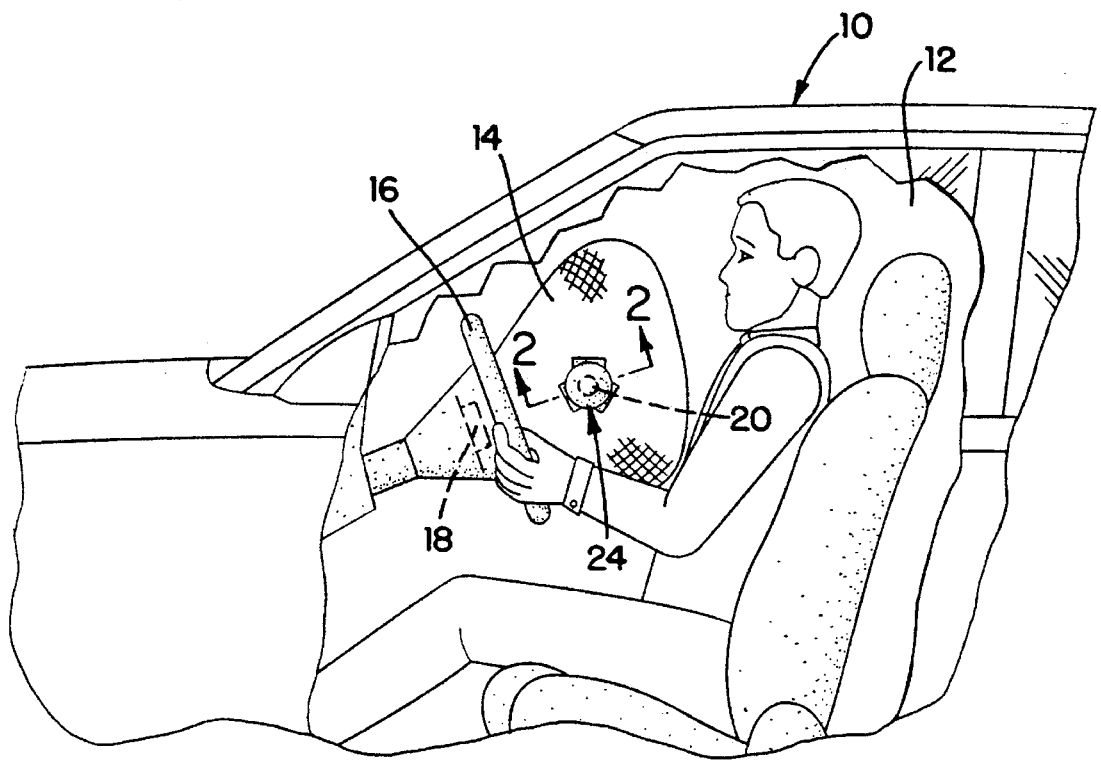
FIG. 1 is a perspective view of a vehicle compartment showing an inflated air bag having the particulate trap of this invention.

Referring to FIG. 1, there is shown a vehicle 10 having an occupant compartment 12 in which an air bag 14 has been inflated from the steering wheel 16. A suitable inflator 18 contained within the steering wheel has generated inflation gas to inflate the air bag 14.

Figure 2:
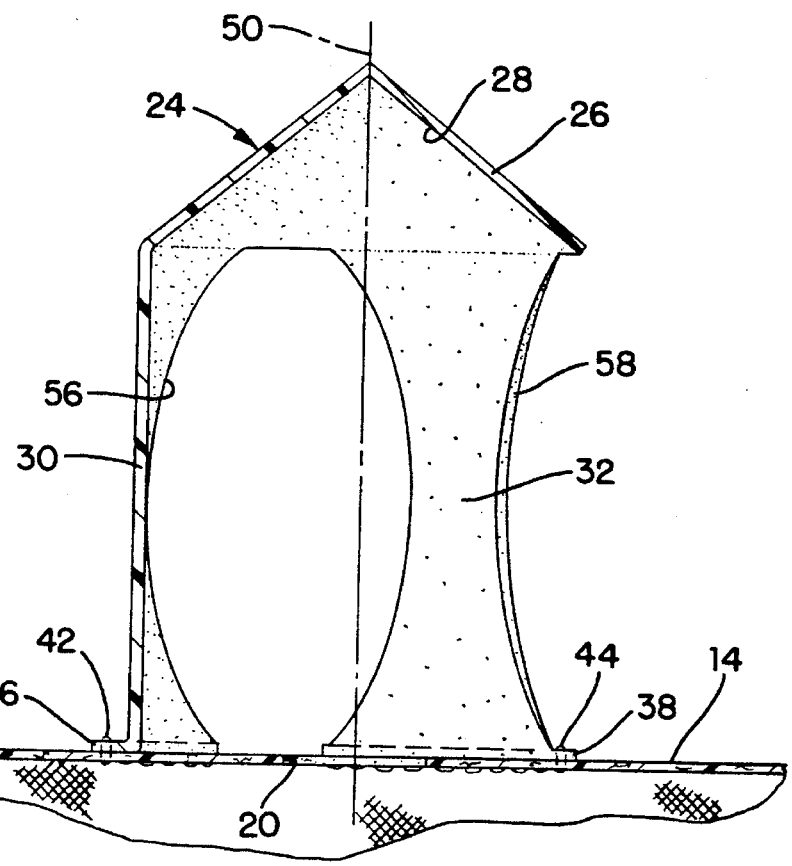
FIG. 2 is a section view taken in the direction of arrows 2—2 of FIG. 1.

As seen in FIGS. 1 and 2, a circular vent hole 20 is provided in the side of the air bag facing away from the occupant to vent inflation gas out of the inflated air bag 14.

Figure 3:
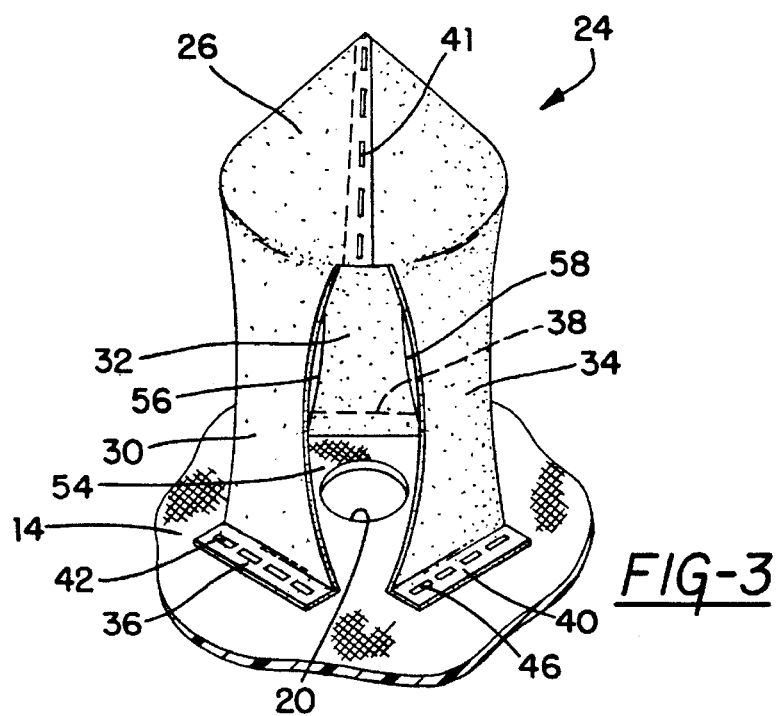
FIG. 3 is a fragmentary perspective view showing the preferred particulate trap and its assembled shape.
Figure 4:
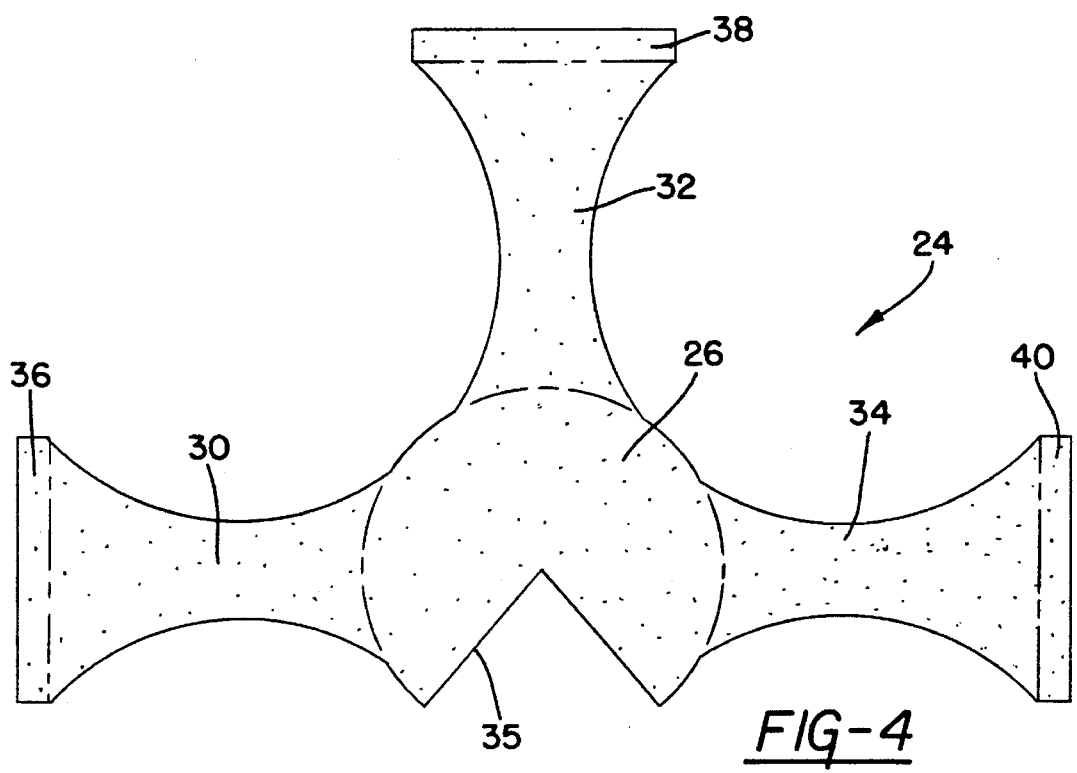
FIG. 4 shows the particulate trap cut from a sheet of fabric prior to its assembly onto the air bag.

A particulate impingement device generally indicated at 24, is provided to capture particulate matter exiting the air bag 14 through the vent hole 20. As best seen in FIGS. 2 and 3, the impingement device 24 includes conical shaped impingement cap 26 having an inner surface 28 and spaced away from the air bag 14 by a plurality of support legs 30, 32 and 34. As best seen in FIG. 4, the impingement device 24 is formed of fabric material similar to the fabric of the air bag 14 and is cut from the fabric in a shape which provides the impingement cap 26 and three radially spaced legs 30, 32 and 34. The portion of the fabric forming the impingement cap 26 has a pie-shaped cutout 35. The particulate impingement device 24 is assembled to the shape shown in FIG. 3 by sewing a line of stitches shown at 41. Accordingly, the impingement cap 26 assumes the conical shape best seen in FIGS. 2 and 3. The length of the legs 30, 32 and 34 is sufficient to permit the respective lower ends thereof to be turned outwardly at 36, 38 and 40 to permit their attachment to the air bag as by stitches 42, 44 and 46. In addition, the length of the supports is sufficient to space the conical shaped impingement cap 26 at a distance spaced away from the vent hole 20, but an overlying axial relationship therewith along the axis 50 of the vent hole 20.

The spacing between the legs 30, 32 and 34 is sufficient to define radial flow openings designated 54, 56 and 58 in FIG. 3 so as not to restrict the flow of vented inflation gas. In addition, as best seen in FIG. 2, it will be understood that the diameter of the conical shaped impingement cap 26 exceeds and is substantially greater in diameter than the diameter of the vent hole 20. The material chosen for construction of the impingement device 24 is preferably chosen for characteristics which will promote the particulate matter borne by the vented inflation gas to and captured thereon. Accordingly, the weave, porosity and/or nature of coating applied to the fabric may be varied to optimize the effectiveness of the impingement action.

It will be appreciated that the drawings show the impingement device erected at its deployed position when the air bag is deployed. In the folded condition, the conical impingement cap 26 is preferably laid flat over the vent hole 20 to expedite erection of the impingement device 24 to its deployed position of FIG. 2. In addition, it will be appreciated that the particulate infringement device is not limited to use on an airbag mounted on the steering wheel and can be used elsewhere in the vehicle.

Thus, it is seen that this invention provides a particulate impingement device for an air bag.

The embodiments of the invention in which an exclusive property or privilege is claimed are defined as follows:

1. In a vehicle air bag system having an air bag inflatable by inflation gas generated by an inflator and a vent hole in the bag through which inflation gas is vented into the vehicle passenger compartment, the improvement comprising:

a particulate impingement device carried by the air bag and having an impingement surface attached to the air bag by a plurality of radially spaced apart fabric support straps which fold atop the air bag and are erectable to define therebetween a plurality of radial flow openings communicating directly into the passenger compartment and to space the impingement surface at a distance spaced away from the vent hole and in axial overlying relationship therewith so that the inflation gas exiting the air bag through the vent hole impinges on the impingement surface to deposit particulate byproducts within the inflation gas upon the impingement surface and the inflation gas is then diverted through the plurality of radial flow openings in a direction radially of the vent hole and the impingement surface directly into the passenger compartment.

2. The improvement of claim 1 further characterized by the impingement surface being conically shaped and having a diameter which exceeds the diameter of the vent hole.

3. The improvement of claim 1 further characterized by the impingement surface being of fabric construction and having the support straps integral with the impingement surface and sewn to the air bag about the vent hole.

* * * * *